(12) United States Patent  
Hennige et al.

(10) Patent No.: US 7,691,529 B2  
(45) Date of Patent: Apr. 6, 2010

(54) LITHIUM BATTERY SEPARATOR HAVING A SHUTDOWN FUNCTION

(75) Inventors: Volker Hennige, Duelmen (DE); Christian Hying, Rhede (DE); Gerhard Hoerpel, Nottuln (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 12/545,900

(22) Filed: Aug. 24, 2009

(65) Prior Publication Data

US 2009/0311418 A1   Dec. 17, 2009

Related U.S. Application Data

(62) Division of application No. 10/524,145, filed as application No. PCT/EP03/07335 on Jul. 8, 2003.

(30) Foreign Application Priority Data

Aug. 24, 2002   (DE)   ................ 102 38 945

(51) Int. Cl.  
*H01M 2/16* (2006.01)  
*H01M 2/14* (2006.01)

(52) U.S. Cl. ...................... 429/144; 429/129

(58) Field of Classification Search ............... 429/144, 429/129  
See application file for complete search history.

(56) References Cited

U.S. PATENT DOCUMENTS

| | | | |
|---|---|---|---|
| 5,091,272 A | 2/1992 | Treger | |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,432,586 B1 | 8/2002 | Zhang | |
| 6,620,320 B1 | 9/2003 | Hying et al. | |
| 6,632,561 B1 | 10/2003 | Bauer et al. | |
| 6,841,075 B2 | 1/2005 | Hoerpel et al. | |
| 2002/0023419 A1 | 2/2002 | Penth et al. | |
| 2002/0039648 A1 | 4/2002 | Horpel et al. | |

(Continued)

FOREIGN PATENT DOCUMENTS

EP   0 951 080   10/1999

(Continued)

*Primary Examiner*—Dah-Wei D Yuan  
*Assistant Examiner*—Zachary Best  
(74) *Attorney, Agent, or Firm*—Oblon, Spivak, McClelland, Maier & Neustadt, L.L.P.

(57) ABSTRACT

Electrical separators for batteries, especially lithium batteries, having a shutdown mechanism. A process for their production. An electrical separator is used in batteries and other systems in which electrodes have to be separated from each other while maintaining ion conductivity. Safety is very important in lithium batteries, since in contrast to other types of battery (Pb, NiCd, NiMeH) the solvent for the electrolyte is not water but a combustible solvent. A separator for lithium cells must possess a shutdown mechanism while not being able to melt down. This is achieved by an electrical separator having a shutdown layer which comprises particles which melt at a desired temperature, close the pores of the separator, and so stop ion flow. Since the separator also comprises a porous inorganic (ceramic) layer on a carrier, the cells cannot melt down as a result of a completely melted separator.

21 Claims, 3 Drawing Sheets

U.S. PATENT DOCUMENTS

| | | |
|---|---|---|
| 2004/0028913 A1 | 2/2004 | Hennige et al. |
| 2004/0038105 A1 | 2/2004 | Hennige et al. |
| 2004/0262169 A1 | 12/2004 | Hying et al. |
| 2005/0031942 A1 | 2/2005 | Hennige et al. |
| 2005/0087491 A1 | 4/2005 | Hennige et al. |

FOREIGN PATENT DOCUMENTS

| | | |
|---|---|---|
| JP | 09 219185 | 8/1997 |
| JP | 10 044348 | 2/1998 |
| WO | 91/19326 | 12/1991 |
| WO | 99/62620 | 12/1999 |
| WO | 2004/021499 | 3/2004 |

LITHIUM BATTERY SEPARATOR HAVING A SHUTDOWN FUNCTION

This is a divisional application of U.S. application Ser. No. 10/524,145, filed Feb. 11, 2005, which is a 371 of PCT/FP03/07335 filed on Jul. 8, 2003.

The present invention relates to electrical separators having a shutdown mechanism, a process for their production and their use in batteries, especially in lithium batteries.

An electrical separator is a separator which is used in batteries and other systems in which electrodes have to be separated from each other while maintaining ion conductivity for example.

The separator is customarily a thin porous insulating material possessing high ion perviousness, good mechanical strength and long-term stability to the chemicals and solvents used in the system, for example in the electrolyte of the battery. In batteries, the separator should fully electronically insulate the cathode from the anode, but be pervious to the electrolyte. Moreover, the separator has to be permanently elastic and to follow movements in the system, for example in the electrode pack in the course of charging and discharging.

The separator is a crucial determinant of the use life of the system in which it is used, for example the use life of battery cells. The development of rechargeable batteries is therefore crucially dependent on the development of suitable separator materials.

The general information about electrical separators and batteries may be gleaned for example from J. O. Besenhard in "Handbook of Battery Materials" (VCH-Verlag, Weinheim 1999).

Separators in use at present consist predominantly of porous organic polymeric films or of inorganic nonwovens, for example webs of glass or ceramic materials or else ceramic papers. These are produced by various companies. Important producers include Celgard, Tonen, Ube, Asahi, Binzer, Mitsubishi, Daramic and others. A typical organic separator consists for example of polypropylene or of a polypropylene/polyethylene/polypropylene composite.

Lithium batteries, which are widely used at the present time, are notable for many advantages, for example high specific energy density, no self-discharging and no memory effect, over systems having aqueous electrolytes, such as NiCd batteries or nickel-metal hydride batteries. But lithium batteries have the disadvantage that they contain a combustible electrolyte which, moreover, can very vigorously react with water. For high energy batteries, ie batteries containing a lot of active material, it is therefore important that the current circuit in the battery is interrupted in the event of an accident and an attendant heating-up of the cell. The interruption is customarily brought about by specific separators which consist of a composite of polypropylene(PP)-polyethylene(PE)-PP. At a certain temperature, the shutdown temperature, the PE will melt and the pores of the separator become closed and the current circuit is interrupted.

A disadvantage of these separators is their limited thermal stability, since the polypropylene will also melt as the cell continues to heat up, so that the entire separator will melt at this meltdown temperature and thus will allow internal short-circuiting over a large area, which will frequently destroy the battery cell by fire or even explosion. True, there are ceramic separators, for example ceramic papers or ceramic wovens or nonwovens, that do not exhibit the meltdown effect, but they unfortunately do not exhibit a shutdown effect either, and that is indispensable for high energy applications in particular and is demanded by battery manufacturers.

Separators or separator membranes without shutdown particles are well known, for example from WO 99/15262. This reference also reveals the production of separators or membranes which are useful as separators. Preferably, however, the porous carriers used for the separators according to the invention are not electroconductive carriers such as woven metal fabrics for example, since the use of such carriers can give rise to internal shortcircuiting when the ceramic coating on the carrier is incomplete. Separators according to the invention therefore preferably comprise carriers composed of nonelectroconductive materials.

A very recent development are hybridic separators which comprise ceramics and polymers. DE 102 08 277 discloses preparing separators based on polymeric substrate materials that have a ceramic, porous, electrically insulating coating. Despite the polymeric constituent present, these separators do not exhibit any shutdown effect when certain temperatures were exceeded, since it is believed that not all the pores were closed.

It is therefore an object of the present invention to provide separators which have a suitable shutdown mechanism and with which meltdown of the battery cell can be prevented at the same time. These separators shall also be useful in lithium high power and high energy batteries and therefore exhibit a high porosity and a very low thickness and yet possess very high mechanical, thermal and chemical stability.

Surprisingly, it was found that separators which are based on a ceramic layer applied to a carrier and which, on this ceramic layer, have a coating with shutdown particles which melt at a desired shutdown temperature, such as a coating with waxy or polymeric particles, are very useful in lithium batteries, since they prevent battery meltdown and also have a shutdown mechanism. Depending on the substrate used, such separators can also be flexible and extremely thin. Adapting the ceramic particles and the shutdown particles to the thickness and pore size of the carrier makes separators having a very high porosity obtainable.

The present invention accordingly provides a battery separator having a shutdown function and comprising a porous carrier having a porous inorganic (ceramic) nonelectroconductive coating layer on and in said carrier, characterized in that a shutdown layer of shutdown particles which melt at a predetermined temperature is present on said inorganic layer and bonded thereto.

The present invention further provides a process for producing a separator according to the present invention, which comprises particles having a defined, desired melting temperature being applied to and fixed on a porous inorganic layer of a separator.

The present invention further provides for the use of separators according to the present invention in batteries, especially lithium batteries, and also the batteries themselves which comprise such a separator according to the present invention.

The separators according to the present invention, comprising a porous carrier having a porous inorganic nonelectroconductive coating layer on and in said carrier, and comprising a shutdown layer of shutdown particles which melt at a predetermined temperature that is present on said inorganic layer and bonded thereto, have the advantage of comprising excellent safety characteristics. These separators according to the present invention comprise a shutdown mechanism which is based on shutdown particles melting at a predetermined temperature and closing the separator by the material of the shutdown particles passing into the pores of the inorganic material and closing them. The separator according to the present invention can never melt down, since the inorganic layer prevents large-area shortcircuiting within the battery even at higher temperatures. The separators according to the present invention thus meet the demands of various battery manufacturers for a safety shutdown within the battery cells. The inorganic particles ensure that there can never be a meltdown. It is accordingly ensured that there are no operating states to give rise to large-area shortcircuiting.

Suitable choice of the shutdown particles and especially of the size of the shutdown particles ensures that separator porosity and hence performance is minimally reduced, if at all.

The separator according to the present invention is also very safe in the event of internal shortcircuiting due to an accident for example. If, for example, a nail were to puncture the battery, the following would happen, depending on the type of separator: a polymeric separator would melt at the site of puncture (a shortcircuiting current flows through the nail and causes it to heat up) and contract. As a result, the shortcircuiting location would become larger and larger and the reaction would get out of control. Only the polymeric shutdown particles would melt in the case of the separator according to the present invention, but not the inorganic separator material. Thus, the reaction in the interior of the battery cell following such an accident would proceed much more moderately. This battery is thus distinctly safer than one with a polymeric separator. This is an important factor in mobile applications in particular.

The advantages of the separator according to the present invention for use in lithium ion batteries can be summarized as follows:

High porosity
Ideal pore size
Low thickness
Low basis weight
Very good wettability
High safety, ie no meltdown but a shutdown effect The separator according to the present invention and a process for producing it will now be described without the invention intending to be limited to these embodiments.

The battery separator according to the present invention having a shutdown function and comprising a porous carrier having a porous inorganic nonelectroconductive coating layer on said carrier is characterized in that at least one shutdown layer of shutdown particles which melt at a predetermined temperature and close the pores of said inorganic layer is present on said inorganic layer and bonded thereto. It is possible in principle for the shutdown layer to be present on both sides of the separator. But it has been determined to be advantageous for the shutdown layer to be present on one side only of the separator according to the present invention. A single shutdown layer is sufficient to ensure safe shutdown in case of need.

The separators according to the present invention preferably comprise carriers which are flexible and preferably less than 50 µm in thickness. The flexibility of the carrier ensures that the separator according to the present invention can be flexible too. Such flexible separators have more diverse applications, for example in wound cells. Carrier thickness has a substantial influence on separator properties, since not only the flexibility but also the sheet resistance of the electrolyte-saturated separator is dependent on carrier thickness.

The separator according to the present invention therefore preferably comprises carriers less than 30 µm and more preferably less than 20 µm in thickness. To be able to achieve sufficiently high battery performance, especially in the case of lithium ion batteries, it has been determined to be advantageous for the separator according to the present invention to comprise a carrier whose porosity is preferably above 50%, more preferably in the range from 50% to 97%, even more preferably in the range from 60% to 90% and most preferably in the range from 70% to 90%. Porosity in this context is defined as the volume of the nonwoven (100%) minus the volume of the fibers of the nonwoven, ie the fraction of the volume of the nonwoven that is not taken up by material. The volume of the nonwoven can be calculated from the dimensions of the nonwoven. The volume of the fibers is calculated from the measured weight of the nonwoven in question and the density of the polymeric fibers. It can be similarly advantageous for the carrier to have a pore radius distribution where at least 50% of the pores have a pore radius in the range from 75 to 150 µm.

The porous carrier preferably comprises woven or nonwoven polymeric, glass or ceramic fibers. More preferably, the carrier includes or is a woven or non-woven glass or polymeric fabric. The polymeric fibers of the carrier are preferably nonelectroconductive fibers of polymers which are preferably selected from polyacrylonitrile (PAN), polyesters, eg polyethylene terephthalate (PET), and/or polyolefin (PO), for example polypropylene (PP) or polyethylene (PE) or mixtures of such polyolefins. The polymeric fibers of the carriers are preferably from 0.1 to 10 µm and more preferably from 1 to 5 µm in diameter. Particularly preferred flexible nonwovens have a basis weight of less than 20 g/m$^2$ and preferably from 5 to 10 g/m$^2$.

The carrier of the separator according to the present invention is particularly preferably a polymeric nonwoven less than 30 µm and preferably from 10 to 20 µm in thickness. It is particularly important that the nonwoven have a very homogeneous pore radius distribution for use in a separator according to the present invention. A very homogeneous pore radius distribution in the nonwoven in conjunction with optimally adapted oxide particles of a specific size leads to an optimized porosity for the separator according to the present invention.

The separator according to the present invention comprises, on and in the carrier, a coating which is porous, electrically insulating and inorganic and preferably ceramic. The porous inorganic coating on the carrier preferably comprises oxide particles of the elements Al, Si and/or Zr having an average particle size in the range from 0.1 to 20 preferably from 0.5 to 10 and most preferably from 1 to 5 µm. The separator more preferably comprises, on and in the carrier, a porous inorganic coating which comprises aluminum oxide particles having an average particle size from 0.1 to 20 preferably from 0.5 to 10 and most preferably from 1 to 5 that are adhered together by an oxide of the metals Zr or Si. Owing to the presence of the inorganic coating on and in the porous carrier, the mechanical properties of the separator according to the present invention are distinctly improved. For instance, spalling of the inorganic coating off the carrier, which can lead to fatal separator failure, can thereby be avoided.

The separators according to the present invention are preferably bendable down to any radius down to 100 mm, preferably down to 50 mm and most preferably down to 0.5 mm without damage. The separators according to the present invention are also notable for a breaking strength of not less than 1 N/cm, preferably of not less than 3 N/cm and most preferably of more than 6 N/cm. The high breaking strength and the good bendability of the separator according to the present invention have the advantage that the separator is able to follow electrode geometry changes occurring in the course of the charging and discharging of the battery without the separator becoming damaged. The bendability, moreover, has the advantage that commercially standardized wound cells can be manufactured using this separator. With these cells, the electrode-separator plies are spirally wound up with each other in standardized size and contacted.

The shutdown particles present according to the present invention on the inorganic layer can be for example natural or artificial waxes, (low-melting) polymers, for example polyolefins, or mixtures thereof, in which case the material for the shutdown particles is selected so that the particles melt at the desired shutdown temperature and close the pores of the separator, preventing further ion flux. It is particularly preferable for the separator according to the present invention to comprise shutdown particles composed of polyethylene (wax).

The size of the shutdown particles is in principle freely choosable, as long as it is ensured that the pores of the inorganic layer are not plugged in the course of the production of the separator according to the present invention. The shutdown particles preferably have an average particle size ($D_w$) which is greater than the average pore size ($d_s$) of the pores of the inorganic layer. Preferably, the shutdown particles have an average particle size ($D_w$) which is in the range from the average pore diameter ($d_s$) to less than 5 $d_s$ and more preferably less than 2 $d_s$. This is advantageous in particular because this prevents pores of the inorganic layer being penetrated and closed, which would result in a reduction in the ion flux and hence in the conductivity of the separator and also the performance of the battery. The thickness of the shutdown particle layer is only critical insofar as an excessively thick layer would unnecessarily increase the resistance in the battery system. To ensure safe shutdown, the shutdown particle layer should have a thickness ($z_w$) ranging from approximately equal to the average particle size of the shutdown particles ($D_w$) to 10 $D_w$, preferably from less than 2 $D_w$ to more than 1 $D_w$.

The porosity of the separator according to the present invention is preferably in the range from 30% to 80%. Porosity here refers to accessible, ie open, pores. The porosity in this sense can be determined by the familiar method of mercury porosimetry or can be calculated from the volume and the density of the ingredients used on the assumption that open pores only are present.

The inventive separators having a shutdown function are preferably less than 50 μm, more preferably less than 40 μm, even more preferably from 5 to 30 μm and most preferably from 15 to 25 μm in thickness. Separator thickness has a substantial influence on separator properties, since not only the flexibility but also the sheet resistance of the electrolyte-saturated separator is dependent on the thickness of the separator. Low thickness ensures a particularly low electrical separator resistance in use with an electrolyte. The separator itself does of course have a very high electric resistance, since it itself must have insulating properties. Moreover, thinner separators permit an increased packing density in a battery stack, so that a larger amount of energy can be stored in the same volume.

The inventive separators having a shutdown function are preferably obtainable by a process for producing such separators comprising particles having a defined, desired melting temperature being applied to and fixed on a porous inorganic layer of a separator without shutdown function as shutdown particles. In principle, any separator comprising an inorganic layer on a porous carrier is useful as a starting material for producing separators according to the present invention.

The production of specific separators and of membranes which are useful as separators in the process according to the present invention is known in principle from WO 99/15262. The use described therein of electroconductive ingredients and flexible carriers, for example stainless steel, however, can lead to separators being obtained which have only very little utility, if any, for producing the separators according to the present invention. The use of separators produced as per the hereinbelow described process has been determined to be particularly advantageous in the process for producing the separator according to the present invention.

The separators which are preferable for use as a separator in the process according to the invention are obtained by applying a suspension, the inorganic nonelectroconductive particles to a porous nonelectroconductive carrier and then solidifying the suspension to form an inorganic coating on and in the porous carrier.

Examples of ways to apply the suspension to the carrier include printing on, pressing, pressing in, rolling on, knife-coating on, spreadcoating on, dipping, spraying or pouring on.

The carrier used is preferably less than 30 μm, more preferably less than 20 μm and even more preferably from 10 to 20 μm in thickness. Particular preference is given to using carriers as described in the description of the separator according to the present invention. The porous carrier used thus preferably comprises woven or non-woven polymeric, glass or ceramic fibers. More preferably, the carrier includes or comprises a woven or nonwoven glass or polymeric fabric.

The carrier used preferably comprises polymeric fibers which have a softening temperature of more than 100° C. and a melting temperature of more than 110° C. It can be advantageous for the polymeric fibers to be from 0.1 to 10 μm and preferably from 1 to 5 μm in diameter.

The suspension used for producing the coating comprises at least one oxide of aluminum, of silicon and/or of zirconium and at least one sol of the elements Al, Zr and/or Si and is prepared by suspending particles of at least one oxide in at least one of these sols. The particles used are preferably from 0.1 to 20 in average particle size.

The sols are obtained by hydrolyzing at least one compound of the elements Zr, Al and/or Si. It can be similarly advantageous for the compound to be hydrolyzed to be introduced into alcohol or an acid or a combination of these liquids prior to hydrolysis. The compound to be hydrolyzed is preferably at least one nitrate, chloride, carbonate or alkoxide compound of the elements Zr, Al and/or Si. The hydrolysis is preferably carried out in the presence of liquid water, water vapor, ice or an acid or a combination thereof.

In one version of the process for producing the separator which can be used, hydrolysis of the compounds to be hydrolyzed is used to prepare particulate sols. These particulate sols are notable for the compounds formed by hydrolysis being present in the sol in particulate form. The particulate sols can be prepared as described above or as in WO 99/15262. These sols customarily have a very high water content, which is preferably above 50% by weight. It can be advantageous for the compound to be hydrolyzed to be introduced into alcohol or an acid or a combination of these liquids prior to hydrolysis. The hydrolyzed compound may be peptized by treatment with at least one organic or inorganic acid, preferably with a 10-60% organic or inorganic acid, particularly preferably with a mineral acid selected from sulfuric acid, hydrochloric acid, perchloric acid, phosphoric acid and nitric acid or a mixture thereof. The particulate sols thus prepared can subsequently be used for preparing suspensions, in which case it is preferable to prepare suspensions for application to natural fiber nonwovens or to polymeric sol pretreated polymeric fiber nonwovens.

In a further version of the process for producing a separator which can be used in the process of the present invention, hydrolysis of the compounds to be hydrolyzed is used to prepare polymeric sols. These polymeric sols are notable for the fact that the compounds formed by hydrolysis are present in the sol in polymeric form, ie in the form of chains crosslinked across a relatively large space. The polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To prepare these sols with the desired very small amount of water and/or acid in the sol, it can be advantageous for the compound to be hydrolyzed to be dissolved in an organic solvent, especially ethanol, isopropanol, butanol, amyl alcohol, hexane, cyclohexane, ethyl acetate and/or mixtures thereof, before the actual hydrolysis is carried out. A sol thus prepared can be used for preparing the suspension of the present invention or as an adhesion promoter in a pretreatment step.

Both the particulate sols and polymeric sols can be used as a sol to prepare the suspension in the process. Not just sols which are obtainable as just described can be used, but in principle also commercially available sols, for example zirconium nitrate sol or silica sol. The process of preparing separators which can be used with preference in the process according to the present invention by applying a suspension to and solidifying it on a carrier is known per se from DE 101 42 622 and in similar form from WO 99/15262, but not all the parameters and ingredients are applicable to the preparation of the separator used in the process of the present invention. More particularly, the operation described in WO 99/15262 is in that form not fully applicable to polymeric nonwoven materials, since the very watery sol systems described therein frequently do not permit complete, in-depth wetting of the customarily hydrophobic polymeric nonwovens, since most polymeric nonwovens are only badly wetted by the very watery sol systems, if at all. It has been determined that even the minutest unwetted areas in the nonwoven material can lead to membranes or separators being obtained that have defects (for example holes or cracks) and hence are inutile.

It has been found that a sol system or suspension whose wetting behavior has been adapted to the polymers will completely penetrate the carrier materials, especially the nonwoven materials, and so provide defect-free coatings. In the process, it is therefore preferable to adapt the wetting behavior of the sol or suspension. This is preferably accomplished by preparing polymeric sols or suspensions of polymeric sols comprising one or more alcohols, for example methanol, ethanol or propanol or mixtures having one or more alcohols and also preferably aliphatic hydrocarbons. But other solvent mixtures are conceivable as well for addition to the sol or suspension in order that the wetting behavior thereof may be adapted to the nonwoven used.

It has been determined that the fundamental change to the sol system and to the suspension resulting therefrom leads to a distinct improvement in the adhesion properties of the ceramic components on and in a polymeric nonwoven material. Such good adhesions are normally not obtainable with particulate sol systems. Preference is therefore given to coating nonwovens comprising polymeric fibers with suspensions which are based on polymeric sols or were equipped with an adhesion promoter in a preceding step by treatment with a polymeric sol.

Particular preference is given to using aluminum oxide particles which preferably have an average particle size of 0.1 to 20 as metal oxide particles for producing the suspension. The mass fraction of the suspended component (particles) is preferably from 1 to 250 times and more preferably from 1 to 50 times that of the sol used.

Aluminum oxide particles in the range of the preferred particle sizes are obtainable for example from Martinswerke under the designations MZS3 and MZS1 and from AlCoA under the designations CT3000 SG, CL3000 SG, CT1200 SG, CT800 SG and HVA SG.

It has been determined that the use of commercially available oxide particles may in certain circumstances lead to unsatisfactory results, since the particle size distribution is frequently very broad. Preference is therefore given to using metal oxide particles which were classified by a conventional process, for example wind sifting and hydroclassification.

To improve the adhesion or the inorganic components to polymeric fibers or nonwovens used as a substrate, but also to improve the adhesion of the shutdown particles to be applied later, it can be advantageous for the suspensions used to be admixed with adhesion promoters, for example organofunctional silancs, for example the Degussa silanes GLYMO, MEMO, AMEO, VTFO or Silfin. The admixing of adhesion promoters is preferred in the case of suspensions based on polymeric sols. Useful adhesion promoters include in particular compounds selected from the octyl silanes, the vinyl silanes, the amino-functionalized silanes, and/or the glycidyl-functionalized silanes, for example the Dynasilanes from Degussa. Particularly preferred adhesion promoters for polyethylene (PE) and polypropylene (PP) are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The adhesion promoters accordingly have to be selected so that the solidification temperature is below the melting or softening temperature of the polymer used as substrate and below its decomposition temperature. Useful adhesion promoters are in particular the silanes listed in Table 1. Suspensions according to the present invention preferably include distinctly less than 25% by weight and more preferably less than 10% by weight of compounds capable of acting as adhesion promoters. An optimal fraction of adhesion promoter results from coating the fibers and/or particles with a monomolecular layer of the adhesion promoter. The amount in grams of adhesion promoter required for this purpose can be obtained by multiplying the amount in g of the oxides or fibers used by the specific surface area of the materials in $m^2 g^{-1}$ and then dividing by the specific area required by the adhesion promoter in $m^2 g^{-1}$, the specific area required frequently being in the order of from 300 to 400 $m^2 g^{-1}$.

Table 1 which follows contains an illustrative overview of usable adhesion promoters based on organofunctional silicon compounds for typical nonwoven material polymers.

TABLE 1

| Polymer | Organofunctional type | Adhesion promoter |
|---|---|---|
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |
| PE, PP | Amino | AMEO, AMMO |
|  | Vinyl | VTMO, VTEO, Silfin |
|  | Methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane In a particular embodiment of the process according to the present invention, the abovementioned adhesion promoters are applied to the substrate, in particular the polymeric nonwoven, in a preceding step. To this end, the adhesion promoters are dissolved in a suitable solvent, for example ethanol. This solution may additionally include a small amount of water, preferably from 0.5 to 10 times the molar amount of the hydrolyzable group, and small amounts of an acid, for example HCl or HNO$_3$, as a catalyst for the hydrolysis and condensation of the Si—OR groups. This solution is applied to the substrate by the familiar techniques, for example spraying on, printing on, pressing on, pressing in, rolling on, knifecoating on, spreadcoating on, dipping, spraying or pouring on, and the adhesion promoter is fixed on the substrate by a thermal treatment at from 50 to not more than 350° C. It is only after the adhesion promoter has been applied in this embodiment of the process according to the present invention that the suspension is applied and solidified.

Application of an adhesion promoter prior to the actual application of the suspension provides improved adhesivity of the substrates especially with regard to aqueous particulate sols, which is why especially thus pretreated substrates can be coated according to the present invention with suspensions based on commercially available sols, for example zirconium nitrate sol or silica sol. But this way of applying an adhesion promoter also means that the production process of the membrane according to the present invention has to be extended to include an intervening or preliminary treatment step. This is feasible albeit more costly and inconvenient than the use of adapted sols to which adhesion promoters have been added, but also has the advantage that better results are obtained even on using suspensions based on commercially available sols.

The suspension present on and in the carrier as a result of the coatings can be solidified for example by heating at from 50 to 350° C. Since the maximum temperature is dictated by the carrier material when polymeric substrate materials are used, the maximum temperature must be adapted accordingly. Thus, depending upon the embodiment of the process, the suspension present on and in the carrier is solidified by heating at from 100 to 350° C. and most preferably by heating at from 200 to 280° C. It can be advantageous for the heating to take place at from 150 to 350° C. for from 1 second to 60 minutes. It is more preferable to solidify the suspension by heating at from 200 to 300° C. and most preferably at from 110 to 280° C. and preferably for from 0.5 to 10 min.

The assembly may be heated by means of heated air, hot air, infrared radiation or by other heating methods according to the prior art.

The process for producing separators which can be used in the process according to the present invention can be carried out for example by unrolling the carrier off a roll, passing it at a speed of from 1 m/h to 2 m/s, preferably at a speed of from 0.5 m/min to 20 m/min and most preferably at a speed of from 1 m/min to 5 m/min through at least one apparatus which applies the suspension atop and into the carrier, for example a roller, and at least one further apparatus whereby the suspension is solidified on and in the carrier by heating, for example an electrically heated furnace, and rolling the separator thus produced up on a second roll. This makes it possible to produce the separator in a continuous process. Similarly, the pretreatment steps can be carried out on a continuous basis by observing the parameters mentioned.

The separators produced in this way or separators produced in some other way frequently comprise inorganic coatings having a very hydrophilic character when the separators were produced without use of an adhesion promoter. To achieve good adhesion and uniform dissipation of the shutdown particles in the shutdown layer on hydrophilic porous inorganic layers as well, there are several possibilities.

In one version of the process according to the present invention, it has been determined to be advantageous to hydrophobicize the porous inorganic layer before the shutdown particles are applied. The production of hydrophobic membranes which can serve as starting material for producing the separators according to the present invention is described in WO 99/62624 for example. Preferably, the porous inorganic layer is hydrophobicized by treatment with alkyl-, aryl- or fluoroalkylsilanes marketed for example by Degussa under the tradename of Dynasilane. It is possible in this context to employ for example the familiar hydrophobicization methods which are employed inter alia for textiles (D. Knittel, E. Schollmeyer; *Melliand Textilber.* (1998) 79(5), 362-363), with minimal changes to the recipes, for porous composite materials that are pervious and were produced, for example, using the process described in PCT/EP98/05939 as well. To this end, a substance-permeable composite material (membrane or separator) is treated with a solution which includes at least one hydrophobic material. It can be advantageous for the solvent in the solution to be water, preferably adjusted to a pH of 1-3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy(3,3,4,4,5,5,6,6,7,7,8,8-tridecafluorooctyl)silane, but a treatment with methyltriethoxysilane or i-butyltriethoxysilane is completely sufficient to obtain the desired effect. The solutions are stirred at room temperature to achieve uniform dissipation of the hydrophobic materials in the solution and subsequently applied to the porous inorganic layer and dried. Drying can be speeded up by treatment at temperatures from 25 to 100° C.

In a further version of the process according to the present invention, the porous inorganic layer can also be treated with other adhesion promoters before the shutdown particles are applied. The treatment with one of the Table 1 adhesion promoters can then likewise be effected as described above, ie by treating the porous inorganic layer with a polymeric sol which includes a silane adhesion promoter. More particularly, the treatment can be effected such that adhesion promoters are used in the production of the separator as described above.

The layer of shutdown particles is preferably created by applying a suspension of shutdown particles in a suspension medium selected from the group consisting of a sol, water or solvent, for example alcohol, hydrocarbon, ether or ketones, and a solvent mixture. The particle size of the shutdown particles present in the suspension is arbitrary in principle. However, it is advantageous for the suspension to include shutdown particles having an average particle size ($D_w$) of greater than the average size of the pores of the porous inorganic layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

The solvent used for the dispersion is preferably water. These aqueous dispersions are adjusted to a polymer or wax content of 1% to 60%, preferably of 5% to 50% and most preferably of 20% to 40% by weight. When water is used as a solvent, it is very simple to obtain preferred average particle sizes of 1 to 10 µm in the dispersion that are very useful for the separators according to the present invention.

When a nonaqueous solvent is used for producing the wax or polymer dispersion, it is preferentially possible to obtain average particle sizes of less than 1 µm in the dispersion. Mixtures of nonaqueous solvents with water can also be used.

If the intention is to employ shutdown particles smaller in size than the pores of the porous inorganic layer, the particles must be prevented from penetrating into the pores of the porous inorganic layer. Reasons for employing such particles include for example large price differences, but also availability. One way of preventing the penetration of shutdown particles into the pores of the porous inorganic layer is to control the viscosity of the suspension in such a way that, in the absence of external shearing forces, no penetration of the suspension into the pores of the inorganic layer takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 10% by weight and preferably from 0.5% to 50% by weight of silica, based on the suspension, will frequently be sufficient to achieve a sufficiently high viscosity for the suspension. The fraction of auxiliaries can in each case be determined by simple preliminary tests.

It can be advantageous for the suspension used, which contains shutdown particles, to contain adhesion promoters. Such a suspension with adhesion promoter can be applied directly to a separator even when the separator was not hydrophobicized prior to application. It will be appreciated that a suspension with adhesion promoter can also be applied to a hydrophobicized separator or to a separator which has been made employing an adhesion promoter. Adhesion promoters useful in the shutdown particle suspension are preferably silanes having amino, vinyl or methacryloyl side groups. Such silanes are available for example from Degussa as pure products or as aqueous solutions of the hydrolyzed silane for example under the designation Dynasilane 2926, 2907 or 2781. An adhesion promoter fraction of not more than 10% by weight has been determined to be sufficient for ensuring sufficient adhesion of the shutdown particles to the porous inorganic layer. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of polypropylene or polyethylene wax.

The shutdown particle suspension may be applied to the porous inorganic layer by printing on, pressing on, pressing in, rolling on, knifecoating on, spreadcoating on, dipping, spraying or pouring on. The shutdown layer is preferably obtained by drying the applied suspension at a temperature from room temperature to 100° C. and preferably from 40 to 60° C. The drying must be carried out in such a way that the shutdown particles do not melt.

It may be preferable for the particles to be fixed after they have been applied to the porous inorganic layer, by heating one or more times to a temperature above the glass transition temperature, so that the particles are fused on without undergoing a change in the actual shape. This makes it possible to ensure that the shutdown particles adhere particularly firmly to the porous inorganic layer.

The applying of the suspension with subsequent drying and any heating to above the glass transition temperature can be carried out continuously or quasicontinuously. When the starting material used is a flexible separator, it can again be unwound off a roll, passed through a coating, drying and, if used, heating apparatus and then be rolled up again.

The separators according to the present invention and the separators produced according to the present invention are especially useful as a separator in batteries, especially as a separator in lithium batteries, preferably lithium high power and high energy batteries. Such lithium batteries can contain electrolytes comprising lithium salts having large anions in carbonates as a solvent. Examples of useful lithium salts are $LiClO_4$, $LiBF_4$, $LiAsF_6$ or $LiPF_6$, of which $LiPF_6$ is particularly preferred. Examples of organic carbonates useful as solvents include ethylene carbonate, propylene carbonate, dimethyl carbonate, ethyl methyl carbonate or diethyl carbonate or mixtures thereof.

The present invention also provides batteries, especially lithium batteries, comprising a separator according to the present invention or produced according to the present invention.

The present invention is more particularly described by FIGS. 1 to 6 without intending the invention to be restricted thereto.

The present invention is described by the examples which follow without being restricted thereto.

COMPARATIVE EXAMPLE 1

S450PET Separator without Shutdown Function

To 160 g of ethanol are initially added 15 g of a 5% by weight aqueous HCl solution, 10 g of tetraethoxysilane, 2.5 g of methyltriethoxysilane and 7.5 g of GLYMO Dynasilane (all Dynasilanes produced by Degussa AG). This sol, which was initially stirred for some hours, is then used to suspend 125 g each of Martoxid MZS-1 and Martoxid MZS-3 aluminas from Martinswerke. This slip is homogenized with a magnetic stirrer for at least a further 24 h, during which the stirred vessel has to be covered over in order that solvent may not escape.

Figure 1:
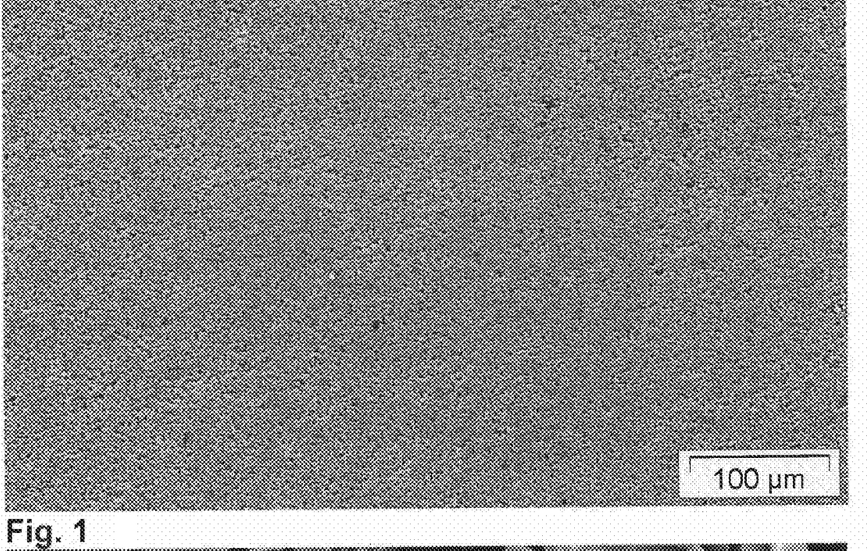
FIGS. 1 and 2 are scanning electron micrographs at different magnification of a conventional separator which has no shutdown particles on the inorganic layer (comparative example 1).
Figure 2:
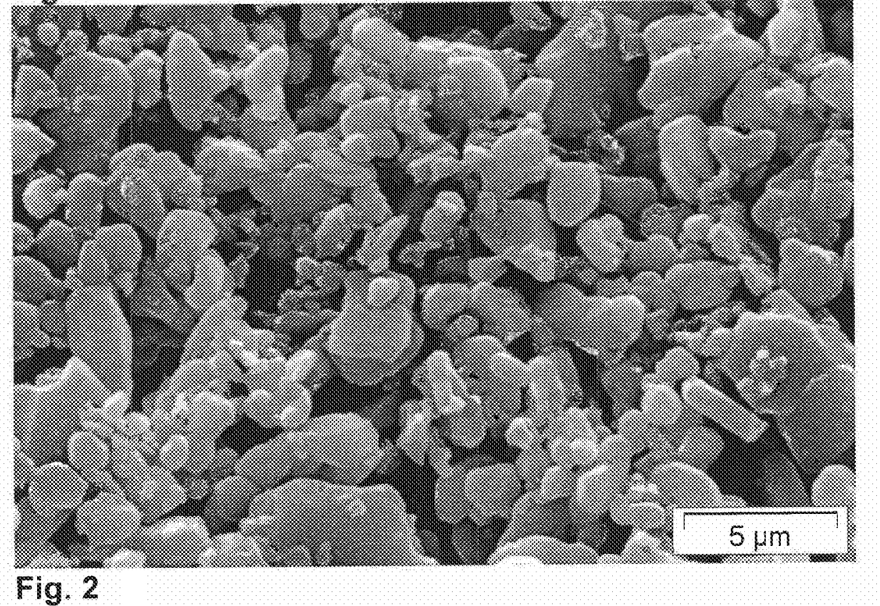

This slip is then used to coat a PET nonwoven about 30 μm in thickness and about 20 g/m² in basis weight in a continuous rollercoating process at a belt speed of about 8 m/h and T=200° C. In this rollercoating process, the slip is coated onto the nonwoven using a roller turning opposite to the belt direction (the direction of movement of the nonwoven). The nonwoven subsequently passes through an oven at the stated temperature. The subsequent tests utilize the same method and arrangement for coating. The end result obtained is a separator having an average pore size of 450 nm and a thickness of about 50 μm. The Gurley number is about 6. FIG. 1 shows such a separator without shutdown function.

This separator is saturated with electrolyte (LiPF$_6$ in 1:1 EC/DMC). The sheet resistance determined by impedance spectroscopy is 5 Ωcm². When the separator is heated to 150° C. prior to saturating with electrolyte, this likewise provides a sheet resistance of about 5 Ωcm².

COMPARATIVE EXAMPLE 2

Lithium Ion Battery with Hybrid Ceramic Separator without Shutdown Function

An S450PET separator produced as per comparative example 1 is installed in a lithium ion cell consisting of a positive mass of LiCoO$_2$, a negative mass consisting of graphite and an electrolyte composed of LiPF$_6$ in ethylene carbonate/dimethyl carbonate [LiCoO2 // S-450-PET, EC/DMC 1:1, 1M LiPF$_6$ // graphite]. The charging and discharging behavior of this battery was tested. The battery decreases in capacity only minimally, by a few percentage points, after about 250 cycles of charging/discharging at C/5. Even increasing the charging voltage from 4.1 to 4.2 volts in the 200th charge cycle does not harm the battery.

This battery is shortcircuited via the external terminals. Owing to the large current which then flows and the internal resistance of the separator, the cell heats up very strongly to above 200° C. But, owing to the ceramic nature of the separator, there is no meltdown which would further increase the temperature and could cause the cell to explode in certain circumstances. At the end, the cell has completely discharged.

INVENTIVE EXAMPLE 1

S450PET Separator with Shutdown Function

An aqueous dispersion of PE wax (Vestowax A616 from Degussa) having an average particle size of 5 μm is prepared. The dispersion is adjusted to a mass content of 20% by weight. This dispersion has added to it 1% of Dynasilane 2907 and is stirred for one hour.

Figure 3:
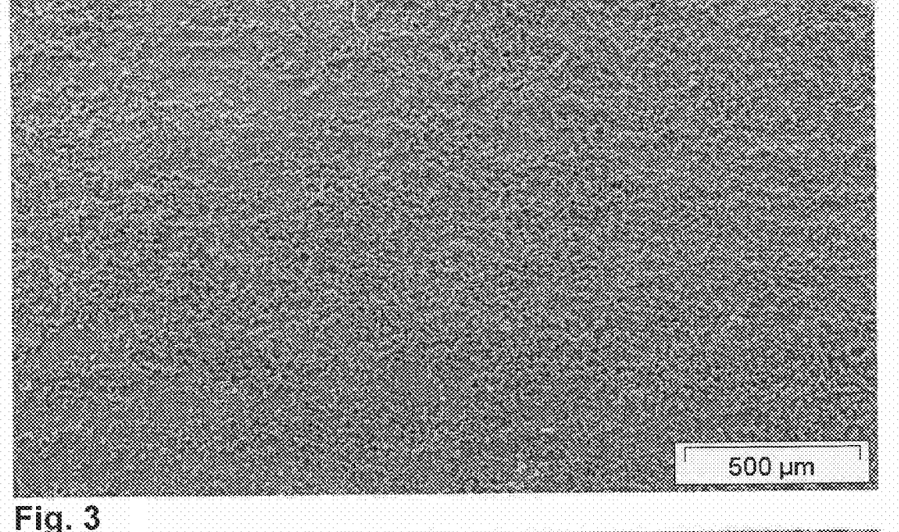
FIGS. 3 and 4 show scanning electron micrographs at different magnification of a separator which has been produced as per inventive example 1 and has a shutdown function. The shutdown particles on the surface are very clearly visible.
Figure 4:
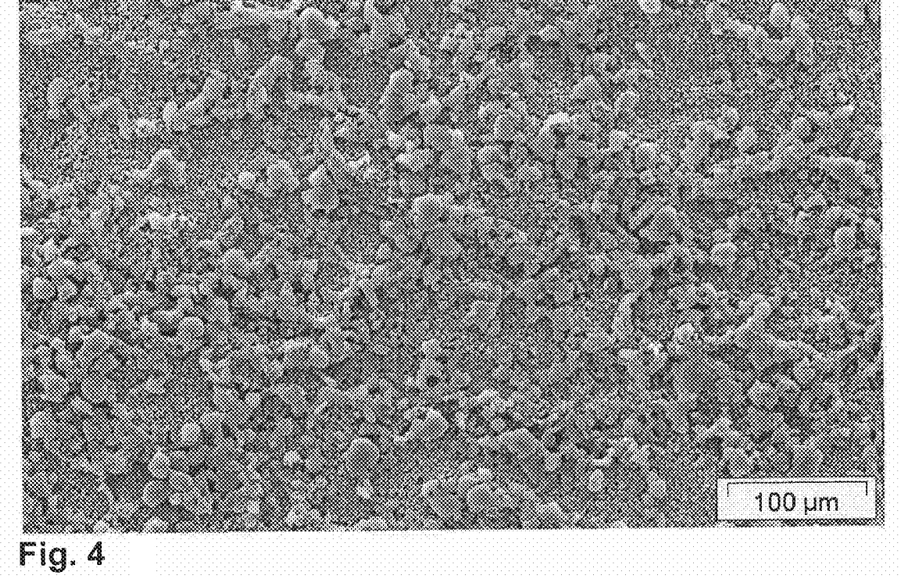

The 50 μM thick separator of comparative example 1 is continually coated with this dispersion by the coating process likewise mentioned in example 1. But the drying now occurs at 60° C. only. FIG. 3 shows an image of such a PE wax coated separator. The PE wax particles are very distinctly visible in FIG. 4.

Figure 5:
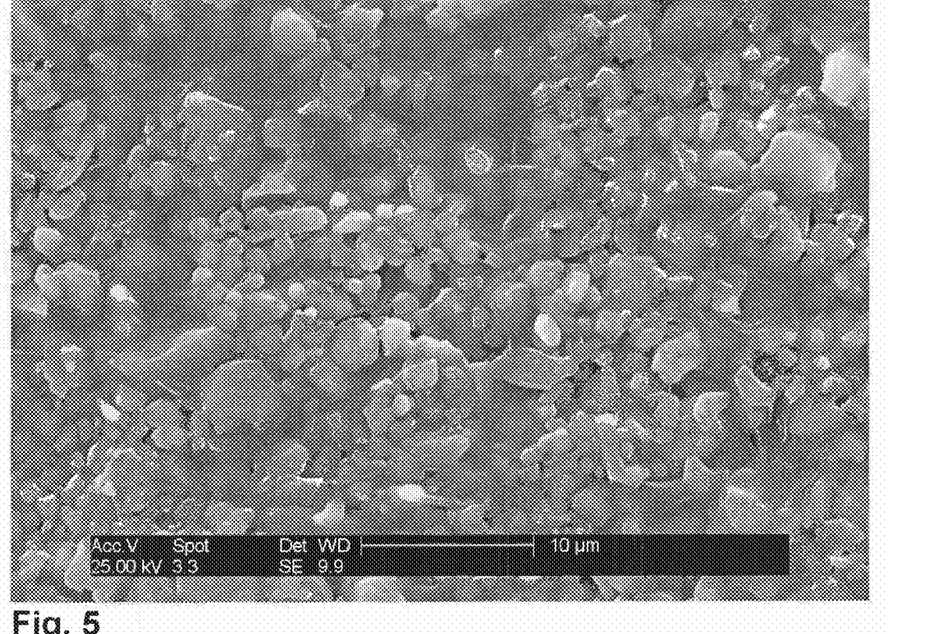
FIGS. 5 and 6 are scanning electron micrographs at different magnification of a separator produced as per inventive example 1 which has a shutdown function and was heat treated at 150° C. The surface formed by the melted shutdown particles is very clearly visible.
Figure 6:
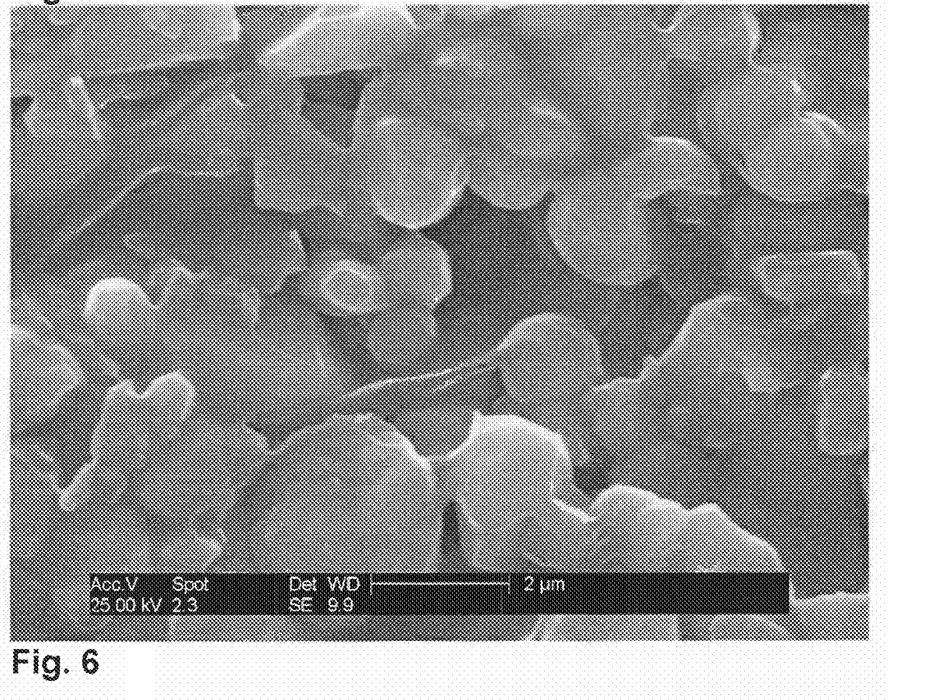

This separator is saturated with electrolyte (LiPF$_6$ in 1:1 EC/DMC). The sheet resistance determined by impedance spectroscopy is 5 Ωcm². When the separator is heated to 150° C. prior to saturating with electrolyte, this now provides a sheet resistance of greater than 500 Ωcm². FIG. 5 shows an image of a separator with shutdown function which has been heat-treated at 150° C. It is clearly visible that the wax particles have melted and the melt has closed the pores of the ceramic layer.

INVENTIVE EXAMPLE 2

Production of an S750PET Separator

To 130 g of water and 30 g of ethanol are initially added 30 g of a 5% by weight aqueous HNO$_3$ solution, 10 g of tetraethoxysilane, 2.5 g of methyltriethoxysilane and 7.5 g of GLYMO Dynasilane (all Dynasilanes produced by Degussa AG). This sol, which was initially stirred for some hours, is then used to suspend 260 g of CL3000 SG (from AlCoA). This slip is homogenized with a magnetic stirrer for at least a further 24 h, during which the stirred vessel has to be covered over in order that solvent may not escape. Prior to coating, this slip is filtered through a 20 μm sieve to remove the coarse fraction.

A PET nonwoven about 15 μm in thickness and about 6 g/m² in basis weight is coated with the above slip in a continuous rollercoating process at a belt speed of about 8 m/h and T=200° C. The end result obtained is a separator having an average pore size of 755 nm and a thickness of 30 μm. The Gurley number is about 3.

An aqueous dispersion of PE wax (Vestowax A616 from Degussa) having an average particle size of 5 μm is prepared. The dispersion is adjusted to a mass content of 20% by weight. This dispersion has added to it 1% of Dynasilane 2926 and is stirred for one hour.

The 30 μm thick separator without shutdown function is continually coated with this dispersion by the coating process described above. But the drying now takes place at 60° C. only.

This separator with shutdown function is saturated with electrolyte (LiPF$_6$ in 1:1 EC/DMC). The sheet resistance determined by impedance spectroscopy is 2 Ωcm². When the separator is heated to 150° C. prior to saturating with electrolyte, this now provides a sheet resistance of greater than 500 $\Omega cm^2$.

INVENTIVE EXAMPLE 3

Production of an S850PET Separator

To 145 g of water and 15 g of ethanol are initially added 30 g of a 5% by weight aqueous $HNO_3$ solution, 10 g of tetraethoxysilane, 2.5 g of methyltriethoxysilane and 7.5 g of GLYMO Dynasilane (all Dynasilanes produced by Degussa AG). This sol, which was initially stirred for some hours, is then used to suspend 280 g of HVA SG (from AlCoA). This slip is homogenized with a magnetic stirrer for at least a further 24 h, during which the stirred vessel has to be covered over in order that solvent may not escape. Prior to coating, this slip is filtered through a 15 µm sieve to remove the coarse fraction.

A PET nonwoven about 15 g/m in thickness and about 6 g/m² in basis weight is coated with the above slip in a continuous rollercoating process at a belt speed of about 8 m/h and T=200° C. The end result obtained is a separator having an average pore size of 865 nm and a thickness of 30 µm. The Gurley number is about 2.

An aqueous dispersion of PE wax (Vestowax A616 from Degussa) having an average particle size of 5 µm is prepared. The dispersion is adjusted to a mass content of 20% by weight. With vigorous stirring, this dispersion has added to it 1% of Dynasilane AMEO in the form of a 50% solution in ethanol and is stirred for one hour. The 30 µm thick separator without shutdown function is continually coated with this dispersion by the coating process described above. But the drying now takes place at 60° C. only.

This separator with shutdown function is saturated with electrolyte ($LiPF_6$ in 1:1 EC/DMC). The sheet resistance determined by impedance spectroscopy is 1.5 $\Omega cm^2$. When the separator is heated to 150° C. prior to saturating with electrolyte, this now provides a sheet resistance of greater than 500 $\Omega cm^2$.

INVENTIVE EXAMPLE 4

Lithium Ion Battery with Hybrid Ceramic Separator

An S450PET separator produced as per inventive example 1 is installed in a lithium ion cell consisting of a positive mass of $LiCoO_2$, a negative mass consisting of graphite and an electrolyte composed of $LiPF_6$ in ethylene carbonate/dimethyl carbonate [LiCoO2 // S-450-PET, EC/DMC 1:1, 1M $LiPF_6$ // graphite]. The charging and discharging behavior of this battery was tested. The battery decreases in capacity only minimally, by a few percentage points, after about 250 cycles of charging/discharging at C/5. Even increasing the charging voltage from 4.1 to 4.2 volts in the 200th charge cycle does not harm the battery.

But on discharging this battery at C (about 3 mA/cm²), it is found that at these high currents it is impossible to discharge the entire capacity. This is attributable to the internal resistance which is still too high.

This battery is shortcircuited via the external terminals. Owing to the large current which then flows and the internal resistance of the separator, the cell heats up very strongly to above 120° C. But at 120° C., then, the PE wax melts, whereupon the ion stream virtually completely collapses and the cell gradually cools back down to ambient temperature. The battery is now in a safe state.

INVENTIVE EXAMPLE 5

Lithium Ion Battery with Hybrid Ceramic Separator

An S850PET separator produced as per inventive example 3 is installed in a lithium ion cell consisting of a positive mass of $LiCoO_2$, a negative mass consisting of graphite and an electrolyte composed of $LiPF_6$ in ethylene carbonate/dimethyl carbonate [LiCoO2 // S-450-PET, EC/DMC 1:1, 1M $LiPF_6$ // graphite]. The charging and discharging behavior of this battery was tested. The battery decreases in capacity only minimally, by a few percentage points, after about 250 cycles of charging/discharging at C/5. Even increasing the charging voltage from 4.1 to 4.2 volts in the 200th charge cycle does not harm the battery.

On discharging this battery at C (about 3 mA/cm²), it is found that virtually the entire capacity of the battery can be discharged at these high currents. This is attributable to higher porosity, lower thickness, larger pore size and hence lower internal resistance compared with inventive example 4. This separator is thus particularly suitable for a high current battery.

An iron nail is hammered through this battery, shortcircuiting the electrodes. Again, substantial heating occurs, and the wax particles melt at 120° C. and close the pores, virtually suppressing the ion stream. But at the nail/separator contact site the temperature has risen to above 150° C. Owing to the ceramic nature of the separator, this region remains intact and there is no meltdown. The cell is in a safe state and cools back down to room temperature.

What is claimed is:

1. A process for producing a lithium battery separator having a shutdown function, which comprises applying particles having a defined, desired melting temperature to a porous inorganic layer of a separator and fixing said particles on said layer, wherein the porous inorganic layer comprises a porous carrier having a porous inorganic nonelectroconductive coating layer on and in said carrier, and wherein said particles form a shutdown layer on said porous inorganic and close the pores of said inorganic layer upon melting.

2. The process according to claim 1, wherein said carrier is flexible and less than 50 µm in thickness.

3. The process according to claim 1, wherein said carrier comprises woven or non-woven polymeric or glass fibers.

4. The process according to claim 3, wherein said carrier is a polymeric nonwoven.

5. The process according to claim 4, wherein said polymeric fibers are selected from fibers of polyacrylonitrile, polyester and/or polyolefin.

6. The process according to claim 1, wherein said carrier is less than 30 µm in thickness.

7. The process according to claim 1, wherein said porous inorganic coating layer present on said carrier comprises oxide particles of the elements Al, Si and/or Zr from 0.5 to 10 µm in size on average.

8. The process according to claim 1, wherein said shutdown particles have an average size ($D_w$) which is greater than the average pore size (d) of said pores of said porous inorganic layer.

9. The process according to claim 1, wherein the layer of shutdown particles has a thickness ($z_w$) which is approximately in the range from said average size of said shutdown particles ($D_w$) up to 10 times said particle size $D_w$.

10. The process according to claim 1, wherein said shutdown particles are selected from the group consisting of polymers, polymer blends, natural waxes and artificial waxes.

11. The process according to claim 1, further comprising said porous inorganic layer being hydrophobicized before said shutdown particles are applied to it.

12. The process according to claim 1, further comprising said porous inorganic layer being treated with an adhesion promoter before said shutdown particles are applied to it.

13. The process according to claim 12, further comprising said porous inorganic layer being produced by using a polymeric sol comprising a silane adhesion promoter for said shutdown particles to be applied later.

14. The process according to claim 1, further comprising said layer of shutdown particles being generated by applying a suspension of shutdown particles having an average size larger than the average pore size of the separator layer in a suspension medium selected from a sol, water or alcohols.

15. The process according to claim 14, wherein said suspension comprises an adhesion promoter.

16. The process according to claim 15, further comprising selecting said adhesion promoter from hydrolyzed or nonhydrolyzed functionalized alkyltrialkoxysilanes.

17. The process according to claim 14, further comprising said suspension being applied to said porous inorganic layer by printing on, pressing, pressing in, rolling on, knifecoating on, brushing on, dipping, squirting, spraying or pouring on.

18. The process according to claim 14, further comprising said layer being obtained by said applied suspension being dried at a temperature in the range from room temperature to 100° C.

19. The process according to claim 1, further comprising following application said particles being fixed on said porous inorganic layer by single heating to a temperature above the glass transition temperature to fuse on said particles without changing the actual shape.

20. The process according to claim 1, wherein said shutdown particles are selected from particles comprising polymers, polymer blends, natural waxes and/or artificial waxes.

21. The process according to claim 20, wherein said shutdown particles are particles composed of polyethylene wax.

* * * * *